(12) United States Patent
Vigouroux et al.

(10) Patent No.: US 9,183,295 B2
(45) Date of Patent: Nov. 10, 2015

(54) METHOD AND APPARATUS FOR RETRIEVING A MEDIA FILE OF INTEREST

(71) Applicant: THOMSON LICENSING, Issy de Moulineaux (FR)

(72) Inventors: Jean-Ronan Vigouroux, Rennes (FR); Valerie Allie, Saint-Armel (FR); Joel Sirot, Montreuil sur Ille (FR)

(73) Assignee: Thomson Licensing (FR)

( * ) Notice: Subject to any disclaimer, the term of this patent is extended or adjusted under 35 U.S.C. 154(b) by 174 days.

(21) Appl. No.: 14/056,136

(22) Filed: Oct. 17, 2013

(65) Prior Publication Data

US 2014/0143669 A1 May 22, 2014

(30) Foreign Application Priority Data

Oct. 17, 2012 (EP) .................................... 12306277

(51) Int. Cl.
*G06F 3/048* (2013.01)
*G06F 17/30* (2006.01)

(52) U.S. Cl.
CPC ...... *G06F 17/3074* (2013.01); *G06F 17/30058* (2013.01); *G06F 17/30061* (2013.01); *G06F 17/30743* (2013.01); *G06F 17/30775* (2013.01)

(58) Field of Classification Search
CPC .... G06F 17/30011; G06F 9/54; G06T 3/4007
See application file for complete search history.

(56) References Cited

U.S. PATENT DOCUMENTS

| | | | |
|---|---|---|---|
| 5,734,893 A * | 3/1998 | Li et al. ......................... | 707/694 |
| 6,046,744 A | 4/2000 | Hoppe | |
| 6,307,554 B1 | 10/2001 | Arai et al. | |
| 6,760,724 B1 * | 7/2004 | Chakrabarti et al. ................. | 1/1 |
| 7,265,755 B2 | 9/2007 | Peterson | |
| 7,546,242 B2 * | 6/2009 | Chevallier et al. ............ | 704/270 |
| 7,777,743 B2 * | 8/2010 | Pao et al. ...................... | 345/428 |
| 2004/0249617 A1 | 12/2004 | Lau et al. | |
| 2006/0221077 A1 | 10/2006 | Wright et al. | |
| 2008/0025529 A1 * | 1/2008 | Keohane et al. .............. | 381/104 |
| 2008/0150937 A1 | 6/2008 | Lundstrom et al. | |
| 2008/0250315 A1 * | 10/2008 | Eronen et al. ................. | 715/706 |
| 2010/0223276 A1 | 9/2010 | Al-Shameri et al. | |
| 2010/0235415 A1 | 9/2010 | Ikada | |
| 2010/0283787 A1 | 11/2010 | Hamedi | |
| 2012/0221971 A1 * | 8/2012 | Trotta et al. ................... | 715/803 |

FOREIGN PATENT DOCUMENTS

WO   WO2011083178   7/2011

OTHER PUBLICATIONS

Retrieving—Digital—Evidence-Methods.*

(Continued)

*Primary Examiner* — William Bashore
*Assistant Examiner* — Rayeez Chowdhury
(74) *Attorney, Agent, or Firm* — Jack Schwartz & Associates, PLLC

(57) ABSTRACT

A method for retrieving a media file from a media rendering device with an initial set of media files stored in the device. Each media file has attributed feature values stored in the device and is associated to a graphical element displayed on a display. The position of each graphical element on the display depends on a multitude of the feature values of the associated media file.

15 Claims, 8 Drawing Sheets

(56) References Cited

OTHER PUBLICATIONS

Frederic Bedard, "Satellite Image Data Processing at Statisics Canada for the Crop Condition Assesment Program (CCAP)", Statistics Canada Intergrated Metadata Base, Apr. 2010, Remote Sensing and Geospatial Analysis Agricultural Division, Canada.
http://www.bayesia.com/en/products/bayesialab/release/bayesialab-4-2.php.
Ferhatosmanoglu et al. "Approximate Nearest Neighbor Searching in Media Databases", 2001 IEEE, 2001, p. 503-511, Santa Barbara.
Flitti et al., "ACP et ACI Pour La Reduction de Donnees En Imagerie Astrononomique Multispectrale", Observatoire Astonomique de Strausbourg, France.
Garcia-Acosta et al., "Dealing with Missing Abnormal, and Incoherent Data in E3N Cohort Study", Revue d'epide miologle et de Scente Publiques, Dec. 1999, p. 515-523, 47 (6).
Guerif et al., "Variables Selection Digital Unsupervised Learning", 2007, p. 1-17, Universite Paris, France.
Hege et al., "Progressive Retrieval and Hierarchical Visualization of Large Remote Data", ZIB Report, Dec. 2003, p. 1-11, Germany.
Lespinats et al. "Visualization Clusters in High-dimensional Spaces", p. 1-5, France.
Mercun et al., "Visualization for Exploration and Discovery",Proceedings on Libraries in the Digital Age, 2010, p. 1-11.
Norman et al., "Diving Deep: Data-Management and Visulaization Strategies for Adaptive Mesh Refinement Simulations", Computing in Science and Engineering, 1999, p. 36-47.
Rafailidis et al., "Nonlinear Dimensionality Reduction for Efficient and Effective Audio Similarity Searching", Multimedia Tools Appl, 2011, p. 881-895,(51) DOI:10,1007/s11042-009-0420-7.
Rosenbaum et al., "A Flexible, Low-Complexity Device Adaptation Approach for Data Presentation", Proc . SPIE , vol. 7868, Vizualization and Data Analysis 2011, 2011, DOI 10.1117/12.871975.
Stober et al., "Musicgalaxy-An Adaptive User-Interface for Exploratory Music Retrieval", 2010 Proceeding of the 11th International Conference on Music Information(ISMIR '10), 2010 Utrecht, Netherlands.
Weber et al., "Visualization of Adaptive Mesh Refinement Data", IS+T/ spie 2001, 2001.
Zhu et al., "HBA: Distributed Metadata Management for Large Cluster-Based Storage Systems", IEEE Transactions on Parallell and Distributed Systems, vol. 19, No. 6., Jun. 2008, p. 750-763.
Deegalla S et al: "Reducing high-dimensional data by principal component analysis vs. random projection for nearest neighbor classification", 2006 Internatioanl Conference on Machine.
Bernhard Feiten and Stefan Gunzel, Automatic indexing of a Sound Database using self-organizing neural nets, Computer Music Journal, 18:3.
Eric Scheirer, Music Listening systems, PhD thesis, MIT Media Laboratory.
Principal Component Analysis by S.Wold published in Chemometrics and Intelligent Laboratory Systems.
Search Report Dated Mar. 28, 2013.

* cited by examiner

|     | Tempo | Energy | Zero crossing | Brightness | Envelope | Bandwidth |
|-----|-------|--------|---------------|------------|----------|-----------|
| MF1 | 51143<br>1.86147 | 1.18507<br>E+8 | 34925 | 3.57<br>-759.773 | 3464.9<br>4637.7 | 5666<br>57743.9 |
| ⋮ | 22546<br>2.2132 | 2.245232<br>E+8 | 15421 | 4.23<br>-852.2 | 5226<br>4512.2 | 6233<br>51283.9 |
|   | 44592<br>1.5623 | 1.1206<br>E+8 | 34509 | 5.02<br>-785.773 | 4699.2<br>5022.8 | 51254<br>55263.8 |
|   | 34512<br>1.9445 | 1.84215<br>E+8 | 39444 | 4.57<br>-612.1 | 5690<br>5022.8 | 5256<br>57998.7 |
|   | 50122<br>1.9045 | 1.2451<br>E+8 | 24567 | 4.56<br>-899.01 | 5692.1<br>4220.8 | 51254<br>55263.8 |
|   | 49223<br>2.1405 | 1.407<br>E+8 | 28102 | 6.23<br>-611.744 | 3884.9<br>5523.2 | 5687<br>51543.5 |
|   | 48599<br>1.8956 | 1.1054<br>E+8 | 31022 | 6.01<br>-562.02 | 3169.2<br>4199.7 | 5126<br>57225.0 |
|   | 21559<br>1.9985 | 1.72945<br>E+8 | 37405 | 4.58<br>-566.23 | 3464.9<br>3652.7 | 5654<br>57743.6 |
|   | 44560<br>1.8944 | 1.4098<br>E+8 | 39552 | 3.95<br>-523.012 | 5264<br>4415.7 | 5989<br>55513.8 |
| MFn | 53555<br>2.2600 | 1.244<br>8 | 38626 | 4.98<br>-528.888 | 3844.5<br>3926.7 | 5777<br>52153.2 |

Fig.2

METHOD AND APPARATUS FOR RETRIEVING A MEDIA FILE OF INTEREST

This application claims the benefit, under 35 U.S.C. §119 of European Patent Application No. 12306277.0, filed Oct. 17, 2012.

TECHNICAL FIELD

The invention pertains to the technical field of data retrieval, more particularly retrieval of media files.

BACKGROUND

Today, many users have huge collections of media files such as music and video files stored on a device. The sheer size of the collection can make it difficult for the user to retrieve a media file of interest for him. One solution for solving this problem is to classify those media files according to features characterizing those media files. Assuming that the media file is for example an audio file, then audio files may be characterized with numerous audio features. In the U.S. Pat. No. 7,546,242, it has been proposed to first compute these audio features for each file: for example, one hundred features are computed for each file; then, a graphical element associated to each file and which position depends on these computed features is positioned on a display. As the positions of the graphical elements to be displayed are two or three-dimensional coordinates, it is necessary to reduce the dimensionality from one hundred (corresponding to the one hundred features) to two or three dimensions (corresponding to the two or three dimensions of the coordinates). Therefore, multidimensionality reduction techniques, such as PCA (Principal component analysis), are used. Details about this technique are described in the article "Principal Component Analysis" by S. Wold published in *Chemometrics and Intelligent Laboratory Systems*, Vol. 2, No. 1. (1987), pp. 37-52. As a result, graphical elements representing the audio files of the audio files collection are positioned on the display in a sparse and discriminative manner. The distance between two displayed graphical elements represents the similarity of the two associated audio files. The user can then easily retrieve an audio file of interest thanks to the meaningful representation of the graphical elements.

When importing a new collection of media files, the position of the graphical elements has to be calculated before being displayed. Once calculated and displayed, the user may retrieve, thanks to the meaningful representation of the graphical elements corresponding to the new imported collection of files, a file of interest. However, the period of time between the import of the new collection of files and the display of the new graphical elements associated to the new imported collection of files may be too long; this prevents the user from retrieving, in a quick and reliable manner, a file of interest belonging to the new imported mass of files.

An object of the invention is to propose a new method achieving this task within a reduced period of time.

SUMMARY OF THE INVENTION

To that purpose, the invention provides with a method for retrieving a media file from a media rendering device 100 with an initial set of media files stored in the device 100. Each media file has attributed feature values stored in the device 100; the device 100 comprises a display 101 for displaying graphical elements; each graphical element is associated with one media file of the initial set of media files, and the position of each graphical element depends on a multitude of the associated features values of the media file; the method comprises the steps of receiving and storing a new set of media files in the device 100, calculating the position of graphical elements associated with the media files of the new set of media files based on a subset of the multitude of associated feature values, displaying the graphical elements associated with the media files of the new set of media files on the display 101 on the calculated positions, and selecting one displayed graphical element to retrieve the associated media file.

Advantageously, the method further comprises the steps of re-calculating the position of the graphical elements associated with the media files of the new set of media files based on an intermediate set of feature values, the intermediate set including the subset and being included in the multitude, and re-displaying the graphical elements associated with the media files of the new set of media files on the display 101 according to the re-calculated positions.

Alternatively, the feature values of the new set of media files are calculated by the device 100.

Advantageously, the method comprises a step of receiving information defining which feature values belong to the subset and which feature values belong to the intermediate set.

The method is suitable for the case when the media file is an audio file.

Advantageously, the media rendering device 100 is adapted for playing back audio files.

Advantageously, the method comprises a step of selecting a point on the display, a step of determining a position of a graphical element associated to a media file of the new set of media files as being closest to the selected point, and a step of emphasizing the determined graphical element.

Alternatively, the method comprises a step of selecting a point on the display, a step of inputting a contour on the display, a step of determining a graphical element associated to a media file of the new set of media files such that the determined graphical element is the closest to the selected point and is encompassed by the input contour, and a step of emphasizing the determined graphical element for retrieving the associated media file.

An apparatus adapted for executing the described methods is envisaged.

For a better understanding, the invention shall now be explained in more detail in the following description with reference to the figures. It is understood that the invention is not limited to the described embodiments and that specified features can also expediently be combined and/or modified without departing from the scope of the present invention as defined in the appended claims.

BRIEF DESCRIPTION OF THE DRAWINGS

FIG. 2 describes an example of audio feature values associated to audio files;

DETAILED DESCRIPTION OF PREFERRED EMBODIMENTS

Figure 1:
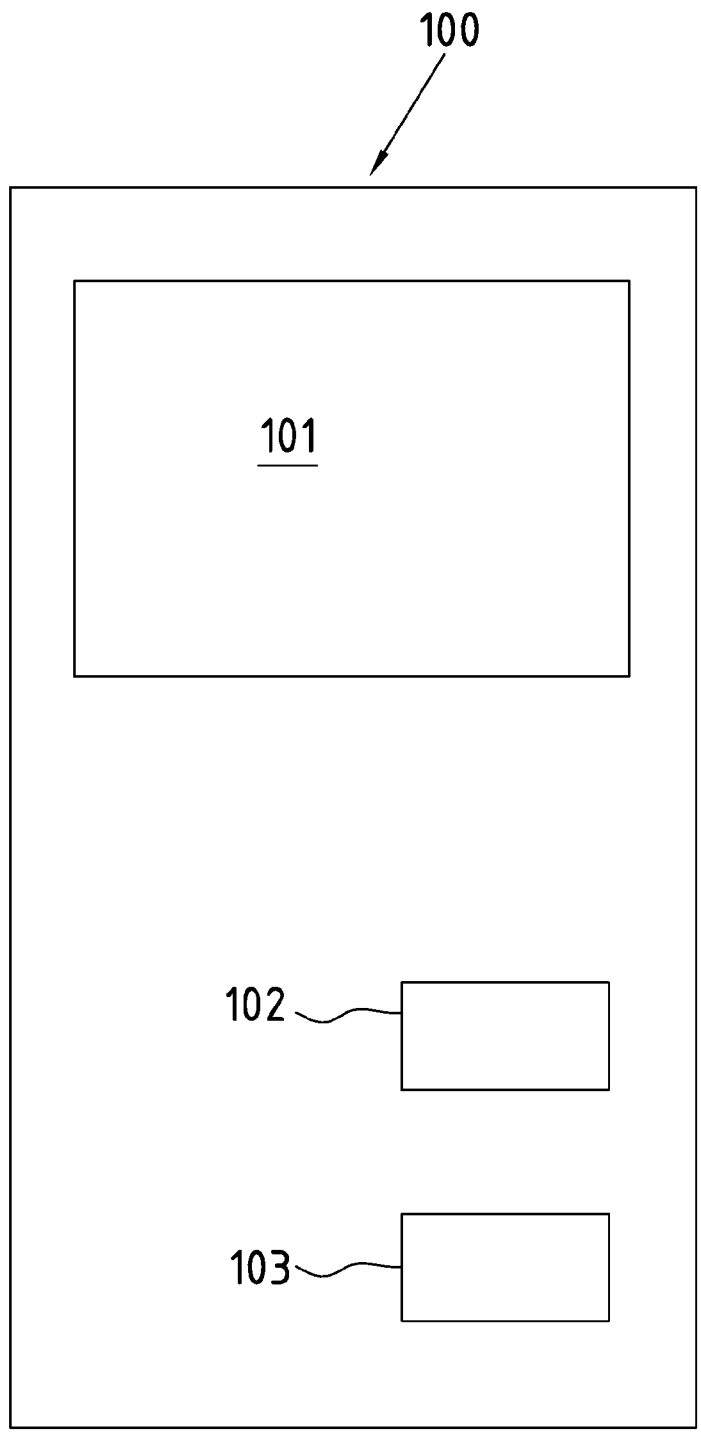
FIG. 1 describes a device allowing the implementation of the present invention.

FIG. 1 shows a device 100 adapted to implement the present invention. The device 100 has a display 101, a memory 102, and a processor 103. An initial set of media files such as audio files, video files and data files are stored in the memory 102. In the following, the invention will be illustrated with audio files as media files even though it is not limited to audio files.

Feature values are attributed to the audio files. These feature values are directly derived of a sound signal analysis of the audio files. Signal analysis techniques make it possible to calculate these feature values for each audio file. Those features are for example Tempo, Energy, Zero crossing rate, brightness, Envelope or bandwidth. They are determined by analyzing the signal either in its digital form, or in its analogue form. The two following articles describe how these feature values are calculated:

B. Feiten and S. Gunzel, Automatic indexing of a Sound Database using self-organizing neural networks, Computer Music Journal, 18 (3[deg.], 1994

Eric Scheirer, Music Listening systems, PhD thesis, MIT Media Laboratory, April 2000.

Examples of such feature values are presented in FIG. 2. Those features are intrinsic to the audio file. One possibility is that the feature values come as metadata with the audio file after having being calculated. Another possibility is that the processor 103 of the device 100 calculates them directly by running an appropriate software stored on the device 100 and known per se.

Figure 3:
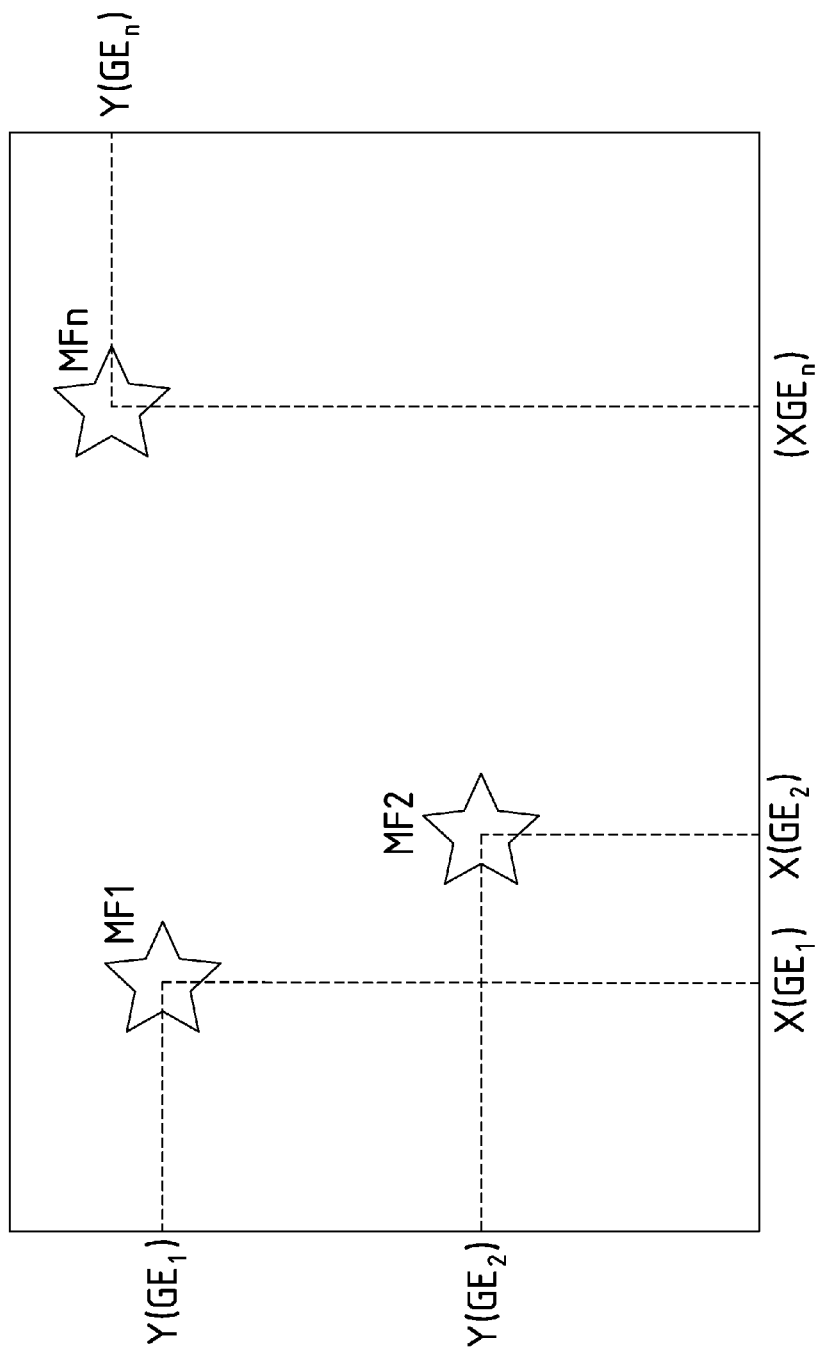
FIG. 3 describes a display with positioned graphical elements displayed on it and associated to respective media files.

A user has a collection of n audio files MF1, . . . , MFn stored on the memory 102 of the device 100. This collection is denoted as an initial set of audio files. Each audio is attributed with feature values, as for example described in FIG. 2. Each audio file MFi is associated to a graphical element GEi (i=1 . . . n) to be displayed on the display 101 of the device 100. This graphical element is a graphical symbol allowing the user to identify an audio file. For example, it is a star and the name of the audio file. FIG. 3 illustrates one possible display configuration. A position is calculated by the processor 103 of the device 100 for each graphical element GE1, . . . , GEn to be displayed. The position of each graphical element depends on the attributed feature values of the associated audio file. For a two-dimensional display 101, the position of a graphical element is composed of two coordinates [X(GE),Y(GE)]. As the multitude of feature values MFV for a given audio file (e.g. fifteen features) exceeds the two dimensions of the display 101, it is resorted to dimensionality reduction techniques, for example PCA technique described before, to calculate the position of the graphical element. Once a position is calculated for each audio file, the associated graphical elements are displayed on the display 101 of the device 100. Thanks to the PCA technique used, the display 101 of the graphical elements is sparse and discriminative. The smaller the distance between two displayed graphical elements is, the more similar the associated audio files are in terms of intrinsic content. The user is then able to select a displayed graphical element and retrieve an audio file of interest.

Figure 4:
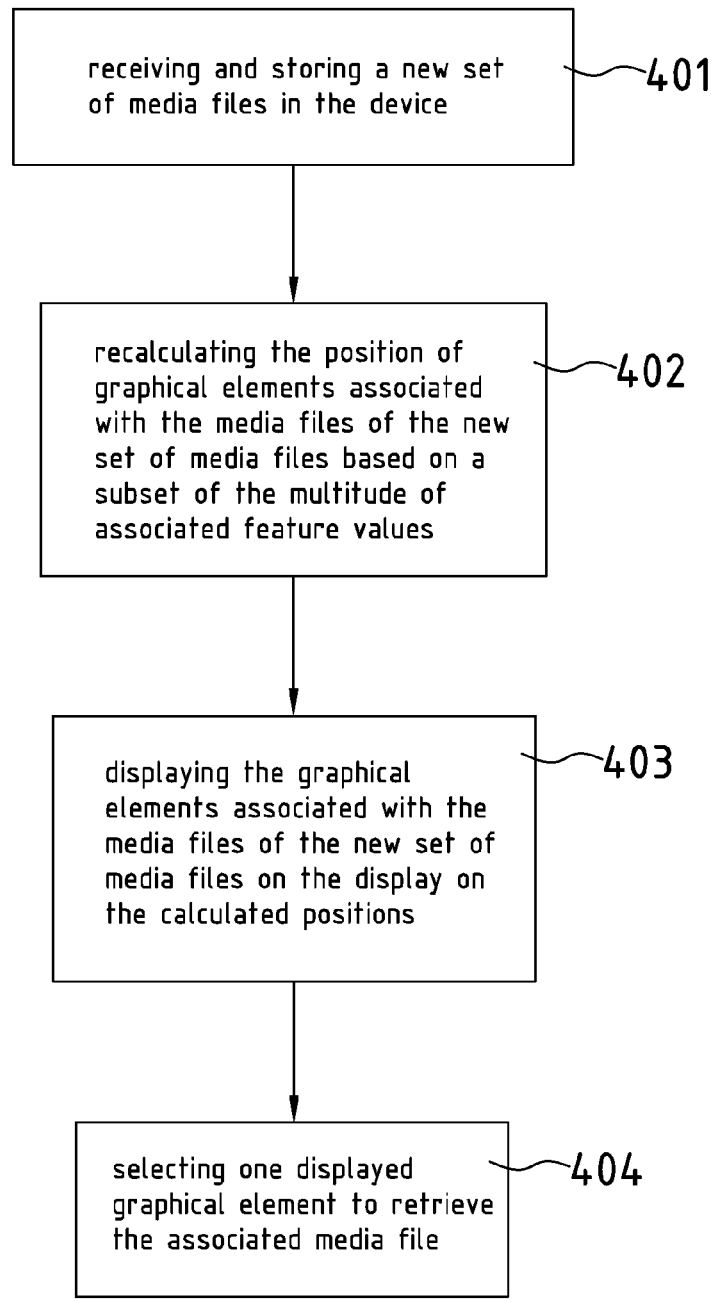
FIG. 4 is a flowchart illustrating a method according to the present invention.
Figure 5:
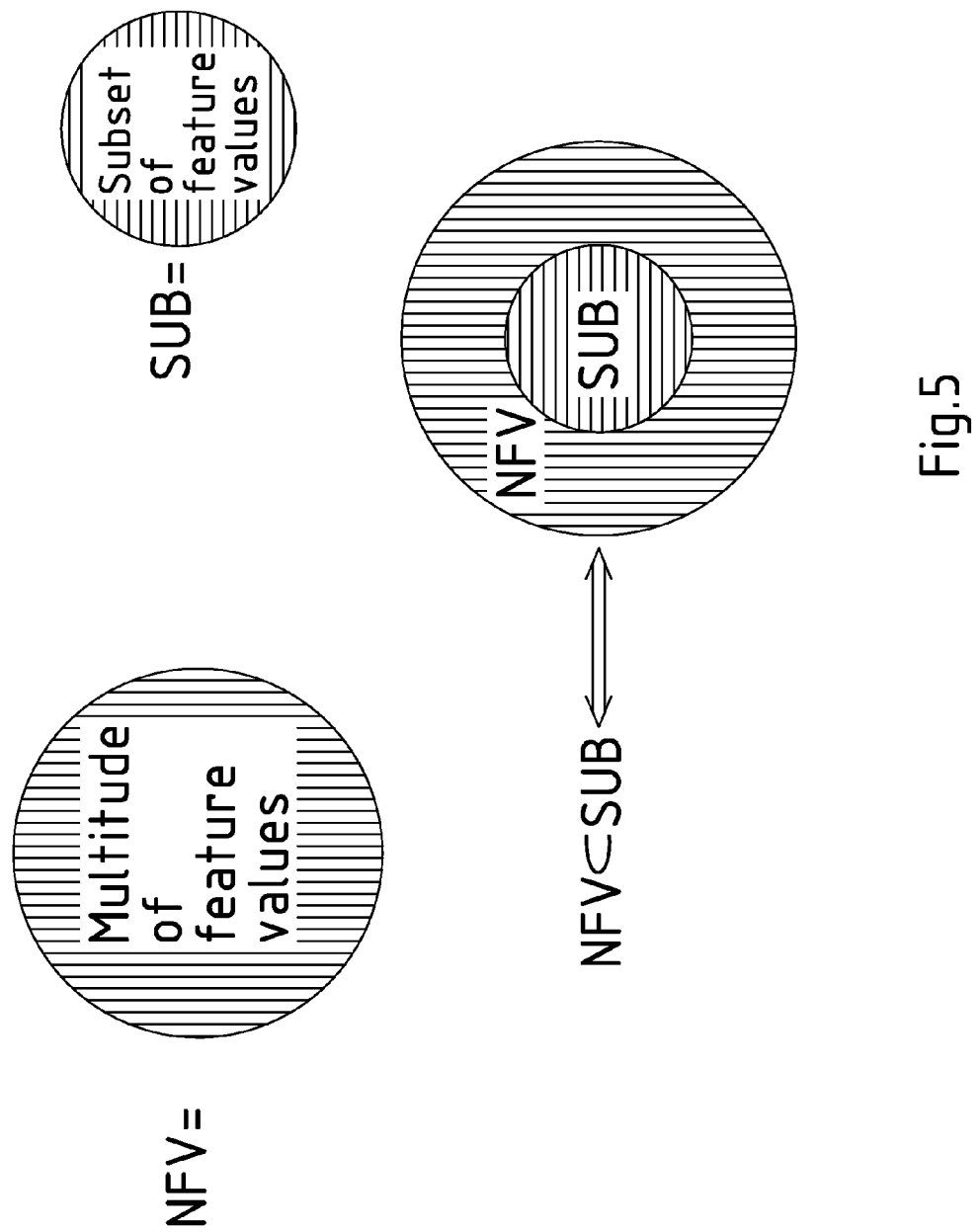
FIG. 5 illustrates the packaging of feature values to different sets and the inclusion relationship between those sets.
Figure 7:
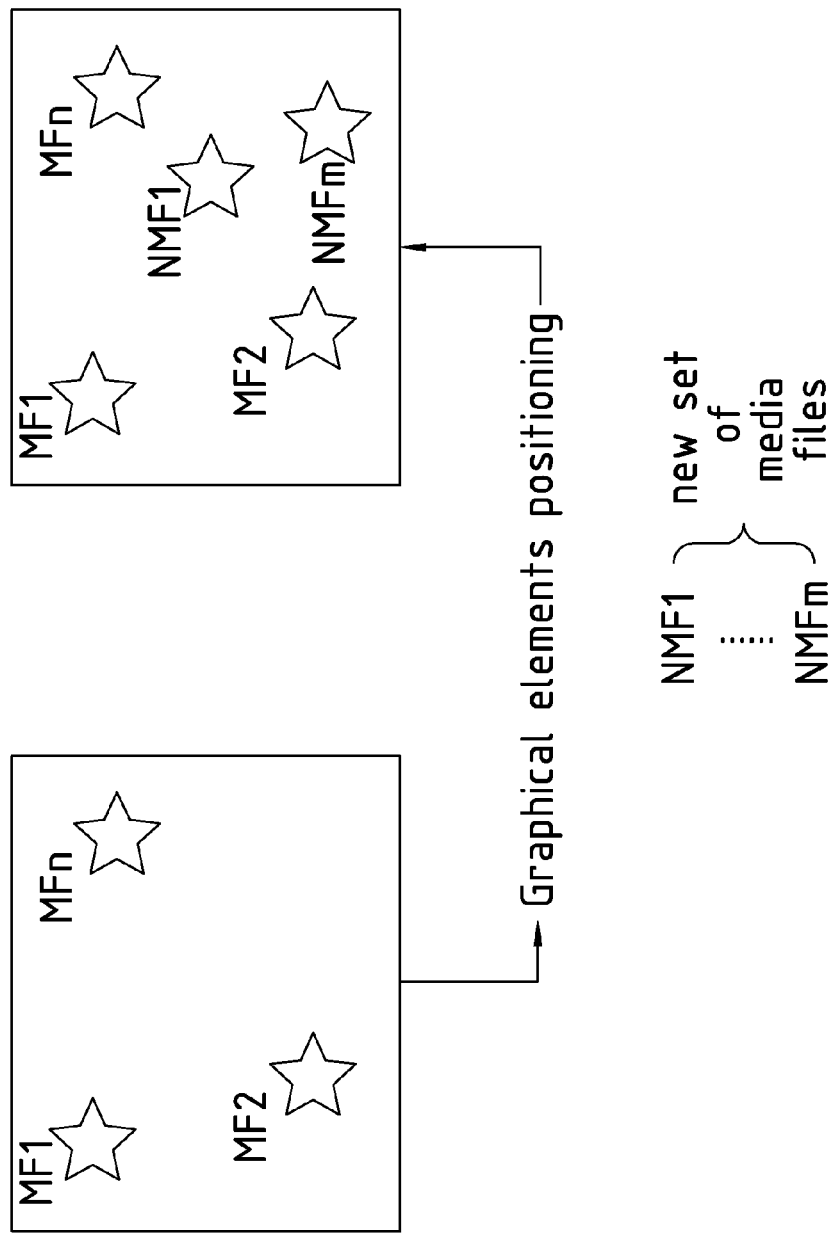
FIG. 7 illustrates the positioning of graphical elements associated with new imported media files.

The user wishes now to import a new set of m audio files; the new set of m audio files NMF1, . . . , NMFm is received and stored in device 100. The user is, of course, impatient to retrieve an interesting audio file from this new set of audio files. The displaying processing described before allows to display the graphical elements in a sparse and discriminative manner and is therefore very helpful to assist a user in his choice. A display of the imported graphical elements of an imported new set of audio files looks like illustrated on FIG. 7. However, this involves a step of multidimensionality reduction, which is likely to take time. The present invention enables to do it as illustrated by the flowchart of FIG. 4 in an advantageous manner. A subset of the multitude of feature values NFV, denoted SUB, and characterized in that it contains less feature values than NFV, is used to calculate the respective position of the graphical elements to be displayed. This inclusion relation is illustrated in FIG. 5. Having used less feature values than those contained in the multitude, the display is less precise but quicker. This results in the user having access to a quicker approximate display of the new positioned graphical elements which allows him to select and retrieve an audio file of interest for him in a quick manner. Advantageously, the features corresponding to the feature values contained in the subset SUB are selected such that they are the most representative of the ideal display, that is the one done with the whole multitude of feature values. This selection is for example in the following way: if the multitude of features consists in fifteen features, and the subset SUB consists of ten features, an offline training is done on a huge collection of audio files (i.e as audio files, such huge collection is representative of the data that is to be processed) to determine which features contribute the most to an approximate display which is the most similar to a display based on fifteen features. The fifteen features are ranked in terms of discriminative power, and the ten most discriminative features are selected as being the features of the subset.

The position of the graphical elements associated with the audio files of the new set of audio files are then calculated based on the ten features of the subset SUB, and the graphical elements are displayed. This calculus is quicker than with the fifteen features of the multitude NFV: as a result, the display of the graphical elements associated to the audio files of the new set of audio files is quicker while close to the display which would have been obtained with the fifteen features of the multitude NFV. This enables the user to select and retrieve an audio file of interest in a quicker way.

Figure 6:
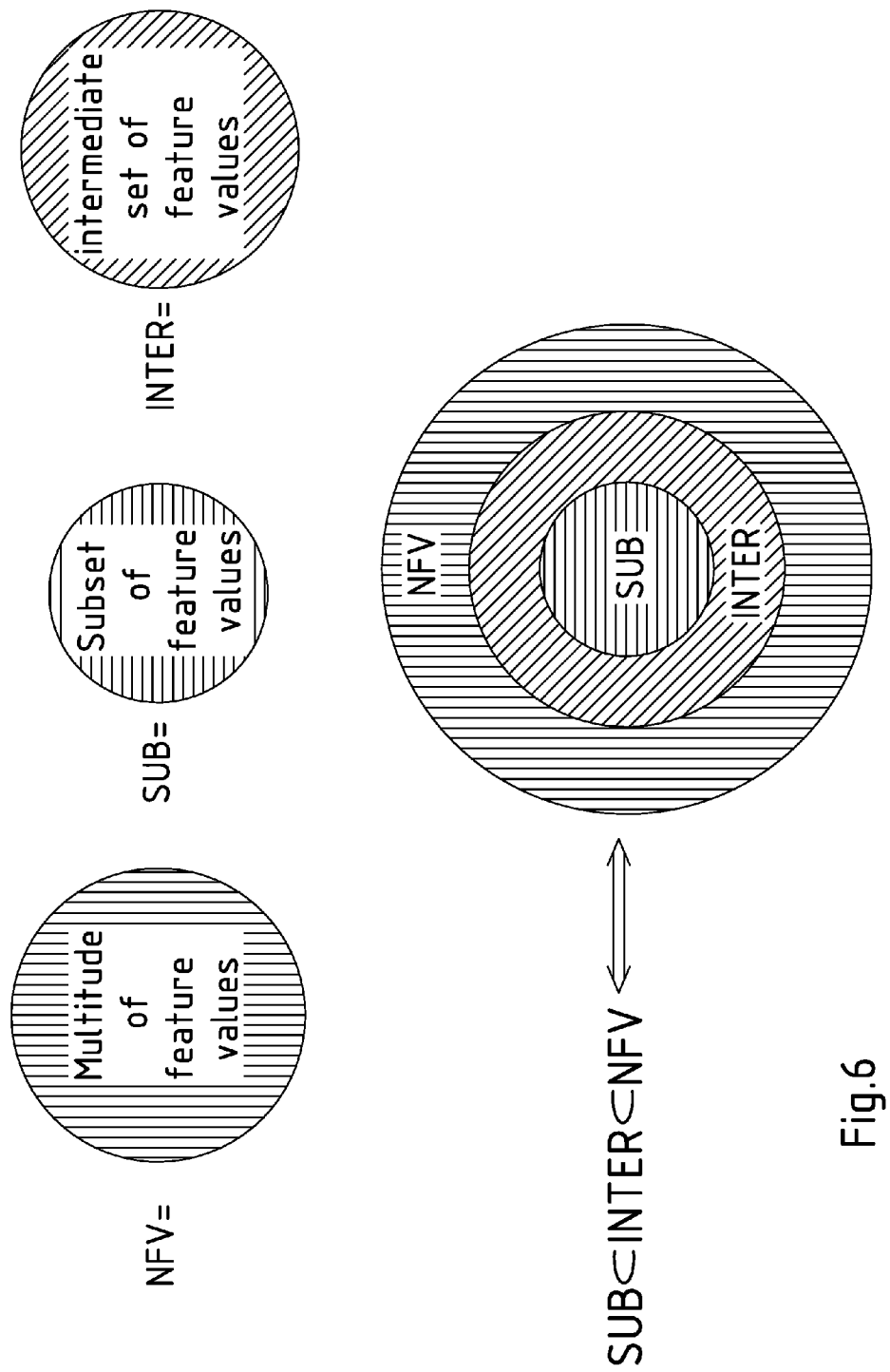
FIG. 6 describes another configuration another possible configuration of sets inclusion according to the present invention.

According to another embodiment, an intermediate set INTER of features is used to re-calculate the positions. This intermediate set has the property of being included in the multitude NFV, while in the same time including the subset SUB. This can be visualized on FIG. 6. To illustrate this embodiment, it will be relied on the same example provided before: NFV contains fifteen features, SUB contains ten features, and INTER contains twelve features. After the display based on the features of the subset SUB, the positions of the graphical elements of the audio files of the new set of audio files are re-calculated based on the features of the intermediate set of features INTER with twelve features. Upon this re-calculation, the graphical elements are re-displayed. As the re-displaying is done based on the features of the intermediate set of features, the graphical elements are displayed more precisely than with the initial displaying with the ten elements of the subset. It also leads to a quicker displaying than a displaying done with the fifteen features of the multitude. As a result, a displaying relying on the twelve features is performed after the displaying relying on the ten features, which leads to a progressive display at the attention of the user of the graphical elements associated to the audio files of the new set of audio files. The re-displaying following the displaying leads to a two-step display of those graphical elements. The user may select an audio file of the new set of audio files upon a first displaying, or upon the re-displaying.

This can also be generalized. Considering p features sets of audio features FS1, ..., Fsp, wherein:

FS1 ⊂ FS2 ... ⊂ FSp

A first position calculation followed by a first display based on the first calculation is conducted based on the features contained in FS1, then a second position calculation followed by a second calculation is conducted based on the features contained in FS2: Following the same process, for i being an integer comprised between 1 and p, an ith position calculation followed by an ith display is conducted based on the features contained in FSi. By performing those successive steps for i from 1 to p, a progressive displaying is performed, each displaying being finer the previous one. The successively displayed graphical elements—i.e. a progressive displaying—will give the impression to the user that the displayed graphical elements converge towards the final ideal displaying based on the whole set of audio features FSp: this enables to select a displayed graphical element associated to the new set of audio files early and without waiting too much, while in the same time enabling him to make a reasonable selection from the new set of audio files. The more he takes time to make a selection, the more precise the displaying of the graphical elements associated to the new set of audio files will be. The user has the choice whether to make an early selection relative to a displaying relying on few audio features, or to make a later selection relying to a displaying relying on more audio features.

In another embodiment, the feature values are calculated by the processor 103 of the device 100. A software program located in the memory 102 of the device 100 is used to perform this. The nature of the feature is taken into account in that the features are computed in a predetermined order learned offline on a database of audio files representative of the data to be processed at the level of the device 100. By using this offline learned order, the calculations of the features is speeded up.

Advantageously, instead of calculating some feature values which are too long to calculate, other predetermined probable values are used. These probable values are, for example, average values attributed to some features which are deduced from statistics performed offline on representative databases. By using these predetermined probable values, there is no more need to calculate them at the level of the device 100. Hence a quicker displaying of graphical elements for the user.

When receiving and storing a new mass of audio files, the user will be impatient to reproduce an audio file adapted to his current mood. An initial collection of audio files is already provided and the associated graphical elements displayed on the display 101 of the device 100. The user then selects a point on the display 101. The display 101 is for example a touch screen and the selection is done by touching an area of the display 101. Meanwhile, the graphical elements associated to the audio files of the new set of audio files are displayed at respective calculated positions as described before. Distances are then calculated between the selected point and the respective calculated positions. Upon the first display of graphical elements associated to the audio files, the graphical element being the closest to the selected point PS is graphically emphasized, for example by highlighting it, and is optionally retrieved or reproduced by the device 100. This way, the fast displaying helps the user interact with the new collection of audio files, and acts as a fast recommendation engine.

Figure 8:
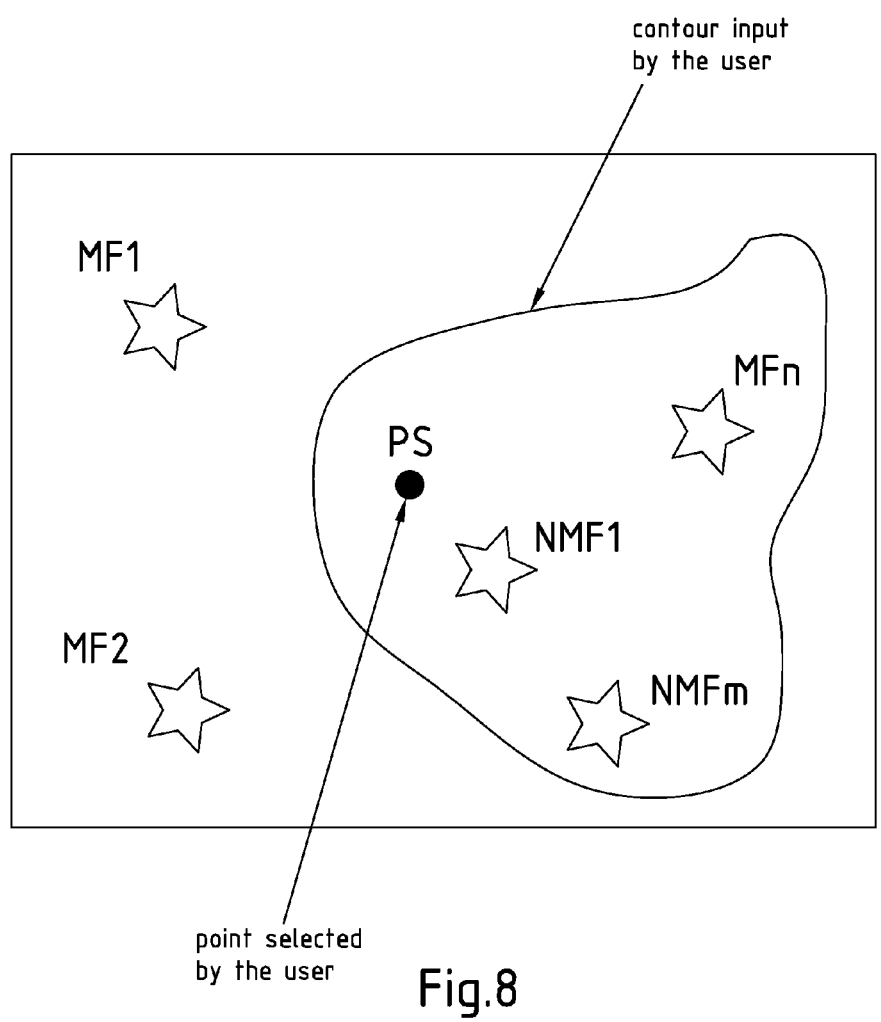
FIG. 8 illustrates how a user may select a media file of interest by inputting a point of interest and a contour.

Optionally, the user inputs a graphical contour around the selected point. This option is illustrated on FIG. 8. Distances are calculated between the graphical elements associated to the initial collection of audio files positioned inside the contour and the position of the selected point PS. The graphical element positioned in the contour being closest to the selected point is identified; This identified graphical element is emphasized and the associated audio file is optionally retrieved or reproduced by the device 100.

The invention claimed is:

1. A method for retrieving a media file from a media rendering device with an initial set of media files stored in the device, each media file having attributed feature values stored in the device and being associated to a graphical element displayed on a display, wherein the position of each graphical element on the display depends on a multitude of the feature values of the associated media file, the method comprising:

receiving and storing a new set of media files in the media rendering device;

calculating the position of graphical elements associated with media files of the new set of media files based on a subset of the multitude of associated feature values;

displaying the graphical elements associated with the media files of the new set of media files on the display at the calculated positions;

re-calculating a position of each graphical element associated with the media files of the new set of media files based on an intermediate set of feature values, wherein the intermediate set contains an amount of feature values greater than an amount of feature values in the subset and less than an amount of feature values in the multitude of the feature values;

re-displaying each of the graphical elements associated with the media files of the new set of media files on the display according to the re-calculated positions; and selecting a displayed graphical element to retrieve the associated media file.

2. The method according to claim 1, wherein re-calculating and re-displaying are done by a device-internal automatic mechanism such that a progressive displaying is performed.

3. The method according to claim 1 further comprising calculating feature values of the new set of media files by the media rendering device.

4. The method according to claim 1, further comprising receiving information defining which feature values belong to the subset and which feature values belong to the intermediate set.

5. The method according to claim 1, wherein the media file is an audio file.

6. The method according to claim 5, wherein the media rendering device is adapted for playing back audio files.

7. The method according to claim 1, further comprising selecting a point on the display upon receipt of a user input, calculating distances between the selected point and the positions of the displayed graphical elements, and graphically emphasizing a closest graphical element to the selected point.

8. The method according to claim 1, comprising selecting a point on the display, inputting a contour on the display, determining a graphical element associated to a media file of the new set of media files, the determined graphical element being a closest graphical element to the selected point and is encompassed by the input contour, and emphasizing the determined graphical element for retrieving the associated media file.

9. An apparatus for retrieving a media file from a set of media files stored in the apparatus, each media file having attributed feature values stored in the apparatus and being associated to a respective graphical element, each graphical element being suitable for display on a display device and a position of each graphical element depending on a multitude of the feature values of the associated media file, the apparatus comprising:

a memory for storing an initial set of media files;

an input port for receiving a new set of media files; and a processor, wherein the processor stores the new set of media files in the memory; calculates a position of graphical elements associated with media files of the new set of media files based on a subset of the multitude of associated feature values; provides the graphical elements associated with the media files of the new set of media files for display at the calculated positions; re-calculates a position of each graphical element associated with the media files of the new set of media files based on an intermediate set of feature values, the intermediate set containing an amount of feature values greater than an amount of feature values in the subset and less than an amount of feature values in the multitude of the feature values; provides each of the graphical elements associated with the media files of the new set of media files for display according to the re-calculated positions; and retrieves a media file in response to receipt of an input selecting a graphical element associated with the media file minimizing a time at which a file can be retrieved after receipt.

10. The apparatus according to claim 9, wherein the processor further-calculates feature values of the new set of media files.

11. The apparatus according to claim 9, wherein the processor defines which feature values belong to the subset and which feature values belong to the intermediate set.

12. The apparatus according to claim 9, wherein the media file is an audio file.

13. The apparatus according to claim 9, wherein the processor is adapted for playing back audio files.

14. The apparatus according to claim 9, wherein upon receipt of an input selecting a point on the display device, the processor calculates distances between the selected point and the positions of the displayed graphical elements, and graphically emphasizes a closest graphical element to the selected point on the display device.

15. The apparatus according to claim 9, wherein upon receipt of an input defining a contour on the display device and an input selecting a point on the display, the processor determines a graphical element associated to a media file of the new set of media files closest to the selected point and encompassed by the input contour, and emphasizes the determined graphical element on the display device for retrieving the associated media file.

* * * * *